US012769342B2

(12) United States Patent
Yang

(10) Patent No.: US 12,769,342 B2
(45) Date of Patent: Oct. 20, 2026

(54) ELECTRIC AIR PUMP POWERED BY EXTERNAL POWER SOURCE

(71) Applicant: JIAO HSIUNG INDUSTRY CORP., New Taipei City (TW)

(72) Inventor: Yung-Hao Yang, New Taipei City (TW)

(73) Assignee: JIAO HSIUNG INDUSTRY CORP., New Taipei City (TW)

( * ) Notice: Subject to any disclaimer, the term of this patent is extended or adjusted under 35 U.S.C. 154(b) by 0 days.

(21) Appl. No.: 18/765,135

(22) Filed: Jul. 5, 2024

(65) Prior Publication Data

US 2025/0377672 A1 Dec. 11, 2025

(30) Foreign Application Priority Data

Jun. 7, 2024 (TW) ................................ 113206055

(51) Int. Cl.
*G05D 16/18* (2006.01)

(52) U.S. Cl.
CPC .................................. *G05D 16/18* (2013.01)

(58) Field of Classification Search
CPC ...... F04B 39/121; F04B 53/00; F04B 45/047; F04B 39/00; F04B 23/106; F04B 53/16; F04B 35/04; F04B 17/03; F04B 35/06; F04D 25/0673; F04D 25/08; F04D 25/068; F04D 29/40
See application file for complete search history.

(56) References Cited

U.S. PATENT DOCUMENTS

| | | | | |
|---|---|---|---|---|
| 10,036,567 | B2 | 7/2018 | Sauer et al. | |
| 10,888,173 | B2 * | 1/2021 | Shakal | F16F 15/08 |
| 11,027,707 | B1 * | 6/2021 | Strong | F04F 5/48 |
| 2019/0219044 | A1 * | 7/2019 | Arnold | F04B 35/06 |
| 2019/0263363 | A1 | 8/2019 | Mcintyre et al. | |
| 2020/0237606 | A1 * | 7/2020 | Colosi | A63B 21/4025 |

FOREIGN PATENT DOCUMENTS

| | | | | |
|---|---|---|---|---|
| CN | 214368668 | | 10/2021 | |
| CN | 115143084 | A * | 10/2022 | F04B 39/121 |
| CN | 116378966 | | 7/2023 | |
| CN | 117212098 | A * | 12/2023 | |
| DE | 102022118371 | | 2/2023 | |
| KR | 20090105648 | | 10/2009 | |
| KR | 20180086824 | | 8/2018 | |
| WO | 2019227263 | | 12/2019 | |
| WO | 2022041368 | | 3/2022 | |

OTHER PUBLICATIONS

English Translation of CN-117212098-A (Year: 2023).*
English Machine Translation of CN 115143084 (Year: 2022).*

* cited by examiner

*Primary Examiner* — Anthony Ayala Delgado
(74) *Attorney, Agent, or Firm* — RABIN & BERDO, P.C.

(57) ABSTRACT

An electric air pump powered by an external power source has an outer shell, a pump assembly, and a control module. The pump assembly is disposed inside the outer shell. The control module is disposed in the outer shell and has a circuit board, a power supply port, and a starting switch. The power supply port is electrically connected to the circuit board and is connectable to an external power source. The starting switch is electrically connected to the circuit board and is operable for controlling whether the circuit board is electrically connected to the pump assembly. Thereby, the electric air pump needs no built-in battery.

6 Claims, 6 Drawing Sheets

ELECTRIC AIR PUMP POWERED BY EXTERNAL POWER SOURCE

BACKGROUND OF THE INVENTION

1. Field of the Invention

The present invention relates to an air pump, and particularly to an electric air pump powered by an external power source.

2. Description of Related Art

A conventional electric air pump drives its pump with electric power so as to pump air and inflate objects such as tires or basketballs. Compared to a traditional air pump driven manually, the conventional electric air pump allows a user to inflate objects by easily pressing buttons, which is convenient in operation.

The conventional electric air pump usually has a built-in rechargeable battery disposed therein. When the rechargeable battery runs out, the conventional electric air pump can be connected to a power source to recharge the rechargeable battery such that the conventional electric air pump is portable. However, since the conventional electric air pump has the built-in rechargeable battery, the following issues may occur when the conventional electric air pump is carried around:

1. Considering boarding regulations on securities which restrict carrying objects with rechargeable batteries, carrying the conventional electric air pump can be inconvenient for travel.
2. When outdoor temperature is high, the temperature inside a transportation vehicle such as a car or a motorcycle increases. Leaving the conventional electric air pump in the transportation vehicles is dangerous, as the rechargeable battery is under high temperature.

To overcome the shortcomings of the conventional electric air pump, the present invention provides an electric air pump powered by an external power source to mitigate or obviate the aforementioned problems.

SUMMARY OF THE INVENTION

The main objective of the present invention is to provide an electric air pump powered by an external power source that omits the built-in battery to solve safety and other issues when the electric air pump is carried around.

The electric air pump powered by an external power source has an outer shell, a pump assembly, and a control module. The pump assembly is disposed inside the outer shell and has a chamber, an inlet passage, and an outlet passage. The inlet passage and the outlet passage both communicate with the chamber and the exterior of the outer shell. The control module is disposed in the outer shell and has a circuit board, a power supply port, and a starting switch. The power supply port is electrically connected to the circuit board and is connectable to an external power source. The starting switch is electrically connected to the circuit board and is operable for controlling whether the circuit board is electrically connected to the pump assembly. The pump assembly is drivable by electric power to pump air to sequentially flow through the inlet passage, the chamber, and the outlet passage.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
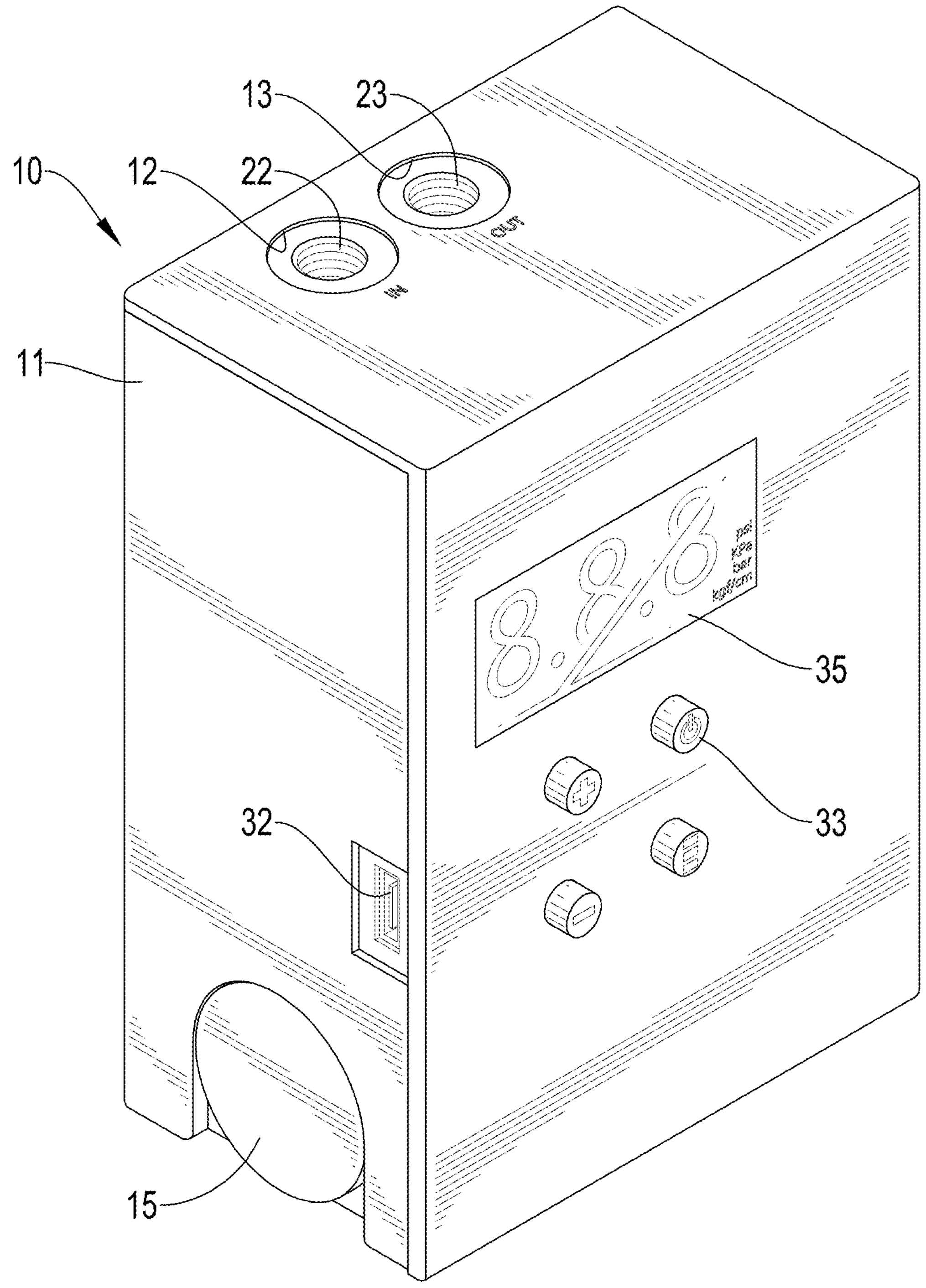
FIG. 1 is a perspective view of a preferred embodiment of an electric air pump powered by an external power source in accordance with the present invention.
Figure 2:
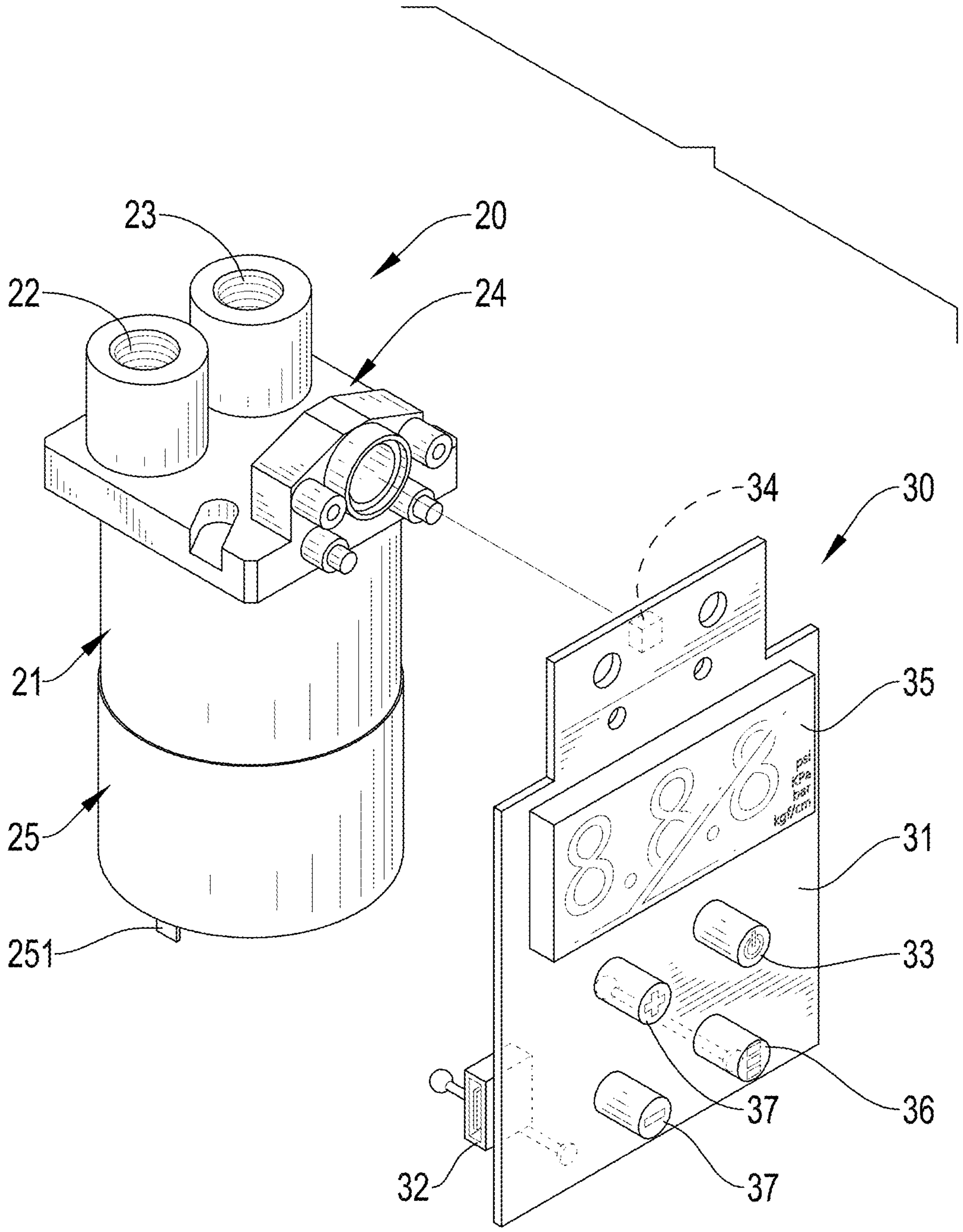
FIG. 2 is an exploded view of the electric air pump in FIG. 1 omitting the outer shell.
Figure 3:
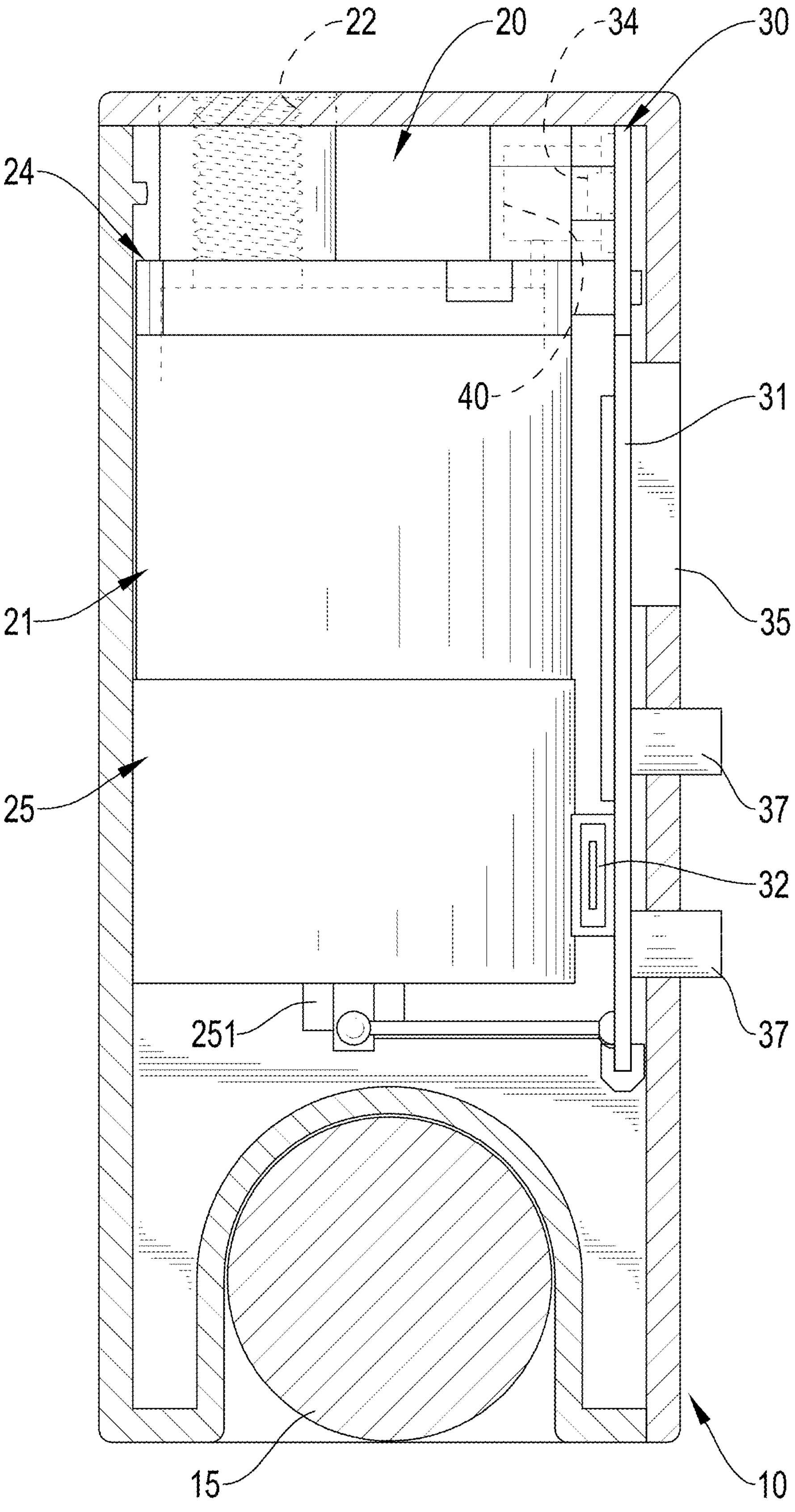
FIG. 3 is a partial sectional view of the electric air pump in FIG. 1.

With reference to FIGS. 1 to 3, a preferred embodiment of an electric air pump powered by an external power source in accordance with the present invention has an outer shell 10, a pump assembly 20, and a control module 30. The pump assembly 20 is disposed inside the outer shell 10 for inflation or deflation. The control module 30 is disposed in the outer shell 10 and acts as a core for transmitting electric power and signals for controlling.

With reference to FIG. 1, the outer shell 10 has a shell body 11, an inlet opening 12 and an outlet opening 13 defined through the shell body 11. The shell body 11 encloses an interior space for the pump assembly 20 and the control module 30 to be disposed therein. The inlet opening 12 and the outlet opening 13 are configured for air to flow therethrough and into or out of the pump assembly 20. Additionally, the shell body 11 further has several openings defined therethrough such that components of the control module 30 can be respectively located in these openings or further protrude from an outer surface of the outer shell 10 to be operable by a user or connectable to other external components.

With reference to FIGS. 2 and 3, the pump assembly 20 has a chamber 21, an inlet passage 22, and an outlet passage 23. The chamber 21 is configured for containing air. The inlet passage 22 communicates with the chamber 21 and an exterior of the outer shell 10, which allows air outside to flow into the chamber 21. The outlet passage 23 communicates with the chamber 21 and the exterior of the outer shell 10, which allows air to flow out of the chamber 21 from the outlet passage 23. The pump assembly 20 is drivable by electric power to pump air such that the air is configured to sequentially flow through the inlet passage 22, the chamber 21, and the outlet passage 23.

With reference to FIGS. 2 and 3, specifically, the pump assembly 20 has a top cover 24, a chamber shell, and a driver 25 sequentially arranged from its top to its bottom. The inlet passage 22 and the outlet passage 23 are defined through the top cover 24, and the chamber 21 is formed in the chamber shell. The top cover 24 covers a top opening of the chamber 21 such that the chamber 21 communicates with the inlet passage 22 and the outlet passage 23 only. With reference to FIG. 1, the inlet passage 22 and the outlet passage 23 are respectively disposed toward and respectively communicate with the inlet opening 12 and the outlet opening 13 so as to communicate with the exterior of the outer shell 10. The driver 25 is connected to the bottom of the chamber and is drivable by electric power to pump air.

Figure 4:
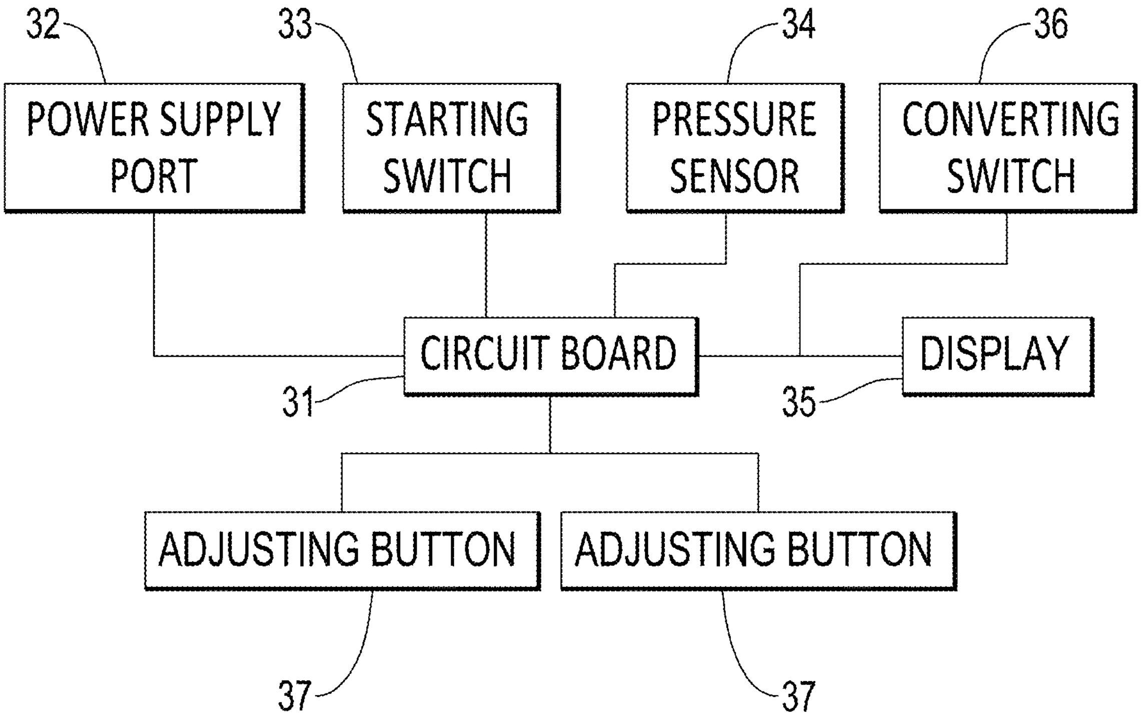
FIG. 4 is a system block diagram of the electric air pump in FIG. 1.

With reference to FIGS. 2 to 4, the control module 30 has a circuit board 31, a power supply port 32, and a starting switch 33. The circuit board 31 is disposed in the outer shell 10, and the control module 30 has a control unit mounted on the circuit board 31 for controlling. With reference to FIGS. 2 and 3, specifically, the driver 25 of the pump assembly 20 has at least one lead 251, and the circuit board 31 is connected to the at least one lead 251 via at least one inner cable. Said inner cable is configured to transmit electric power and signals such that the control unit on the circuit board 31 is configured to control operation of the pump assembly 20.

With reference to FIGS. 2 to 4, the power supply port 32 and the starting switch 33 are electrically connected to the circuit board 31. The control unit on the circuit board 31 is configured to acquire an external electric power via the power supply port 32. The starting switch 33 is operable by a user for controlling whether the circuit board 31 is electrically connected to the pump assembly 20. Specifically, the power supply port 32 is disposed toward one of the several openings on the shell 11 such that the power supply port 32 can be connected to an external power source via the above-mentioned opening. The starting switch 33 is mounted through another one of the several openings on the shell 11 to be operable by a user. The starting switch 33 is specifically a button being pressable. In other embodiments, the starting switch 33 may adopt a knob or a rocker switch.

Figure 5:
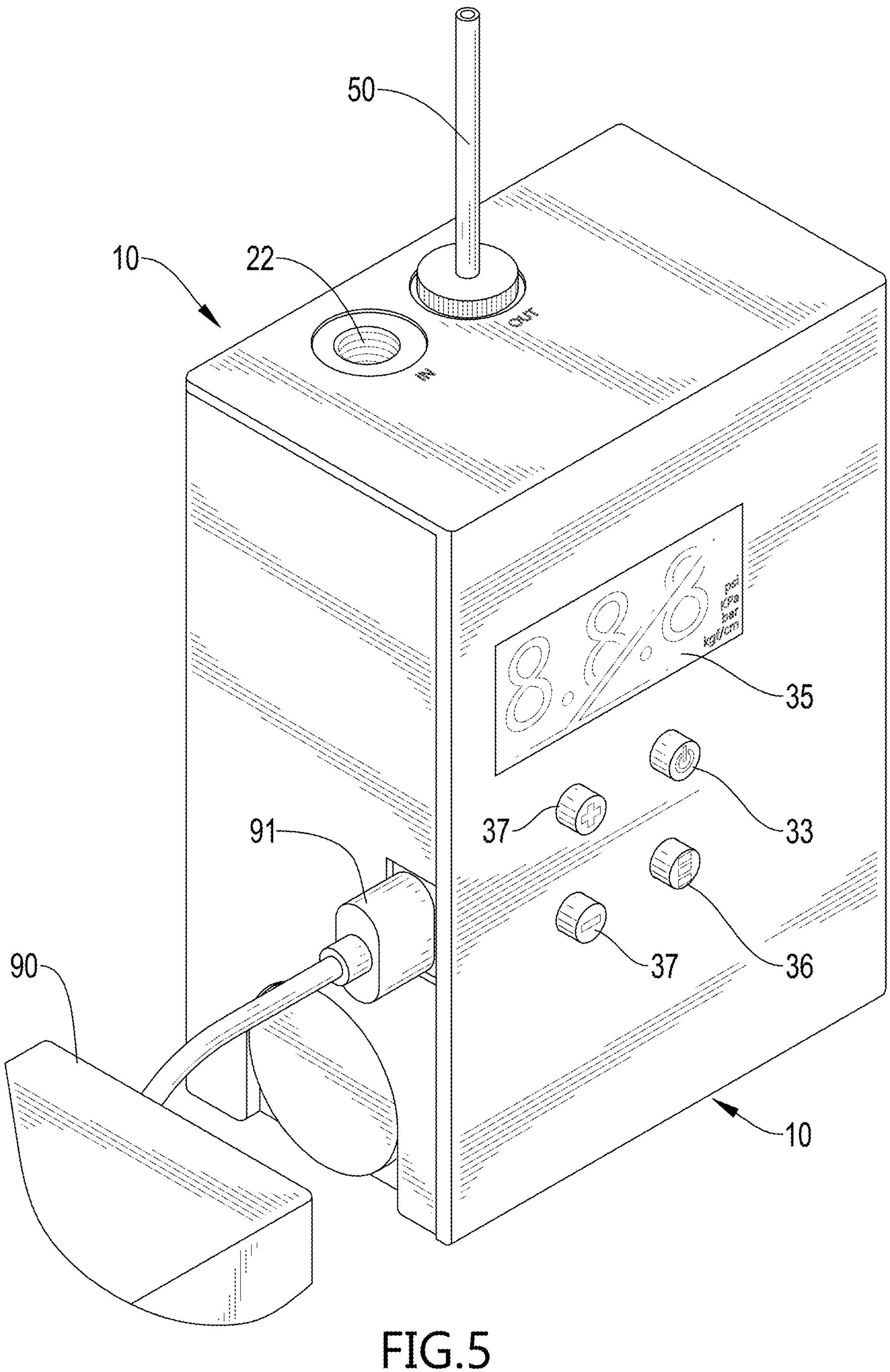
FIG. 5 is an operational view of the electric air pump in FIG. 1 during inflating.

The electric air pump powered by an external power source in accordance with the present invention is portable and can be carried around by a user. To use the electric air pump, the power supply port 32 is first connected to an external power source. With reference to FIG. 5, specifically, the external power source may adopt a portable power bank 90, and the portable power bank 90 is connected to the power supply port 32 via a plug 91 on a power cable. The power cable may be an attachment extending from the portable power bank 90 or an individual component inserted to the portable power bank 90.

With reference to FIGS. 2 and 3, specifically, the power supply port 32 and the plug 91 are respectively a USB Type-C port and a USB Type-C plug being connectable with each other via insertion to transmit electric power. In other embodiments, the power supply port 32 may adopt a USB Type-A port, a USB Type-B port, or any other connecting port. As long as the power supply port 32 is configured to be connected with a corresponding plug 91 to allow an external electric power from the external power source to be transmitted to the circuit board 31 via the power supply port 32, the type of the power supply port 32 is not limited to the preferred embodiment.

After the plug 91 is inserted into the power supply port 32, the control unit on the circuit board 31 is started by the external electric power from the portable power bank 90 and is configured to control the operation of the electric air pump. For example, when inflating a space in an object, the outlet passage 23 first communicates with the space to be inflated. Then, the starting switch 33 is operated to control the external electric power to be supplied to the pump assembly 20. Specifically, when the starting switch 33 is pressed, the control unit senses the pressing on the starting switch 33 and then connects a circuit on the circuit board 31 to said inner cable and said lead 251. Thereby, the external electric power can be transmitted to the driver 25 via the above circuit to drive the pump assembly 20. The pump assembly 20 then pump air outside to flow into the to-be-inflated space through the inlet passage 22, the chamber 21, and the outlet passage 23 so as to inflate the object.

To deflate while overinflating or in other conditions, the inlet passage 22 first communicates with a deflated space. Then, the starting switch 33 is operated for controlling the circuit board 31 to be electrically connected to the pump assembly 20 such that the external electric power can be transmitted to the pump assembly 20. Thereby, the pump assembly pumps the air in the deflated space to flow through the chamber 21 through the inlet passage 22, the chamber 21, and the outlet passage 23 so as to achieve deflation.

The electric air pump powered by an external power source in accordance with the present invention has the power supply port 32 to be connected to an external power source. The external electric power from the external power source can be transmitted to the circuit board 31 and then to the pump assembly by operating the starting switch 33. Thereby, the electric air pump needs no built-in battery. When the electric air pump is carried around and placed on a vehicle, there are no worries about safety of and damage to battery under a high temperature. When boarding with the electric air pump, a user also needs not consider the security regulations or restriction about batteries. The electric air pump of the present invention is thus more convenient for carrying around compared to the conventional electric air pump.

Further, with reference to FIGS. 2 to 4, in the preferred embodiment, the control module 30 has a pressure sensor 34 electrically connected to the circuit board 31 and disposed in a sensing space 40. With reference to FIG. 3, the sensing space 40 communicates with the space 211 in the chamber 21 of the pump assembly 20. The pressure sensor 34 is configured to sense the pressure in the sensing space 40 so as to send a pressure data to the control unit on the circuit board 31 accordingly. Since the chamber 21 communicates with the sensing space 40 and further communicates with said to-be-inflated space or said to-be-deflated space via the outlet passage 23 or the inlet passage 22, the control unit is configured to calculate and acquire the pressure of the chamber 21 or further the pressure of the to-be-inflated space or the to-be-deflated space so as to control the inflation (deflation) according to said pressure or present pressure information of said pressure.

With reference to FIGS. 2 to 4, the control module 30 further has a display 35 electrically connected to the circuit board 31 and being observable from an exterior of the outer shell 10. In the preferred embodiment, the display 35 is located in one of the several openings on the shell body 11 and is flush with the outer surface of the outer shell 10 to be observable. After the control unit calculates and acquires the pressure of the chamber 21 (or the to-be-inflated/to-be-deflated space), the control unit controls the display 35 to present pressure information of the chamber 21 for a user to check the state of the inflation or deflation.

In other embodiments, the display 35 may protrude from the outer surface of the outer shell 10 or be completely located inside the outer shell 10, which still allows the display 35 to be observed from said opening on the shell body 11. In addition, the shell body 11 of the outer shell 10 may be transparent. In all embodiments described above, the display 35 is observable from the exterior of the outer shell 10 to achieve its function.

Moreover, with reference to FIGS. 2 and 4, the control module 30 has a converting switch 36 electrically connected to the circuit board 31. The converting switch 36 is operable to send a converting signal to the control unit on the circuit board 31. The control unit is configured to calculate different pressure values according to the pressure data and to control the display 35 to present any one of the pressure values of the pressure according to the converting signal.

Specifically, the pressure can be expressed in different units such as pound-force per square inch (psi), kilogram-force per square centimeter ($kgf/cm^2$), kilopascal (kPa), and bar. After the control unit on the circuit board 31 receives the pressure data from the pressure sensor 34, the control unit is configured to calculate and acquire multiple pressure values of the pressure of the chamber 21 (or the to-be-inflated/to-be-deflated space) in different units according to operation expressions stored in the control unit. During inflation or deflation, a user may operate the converting switch 36 such that the control unit controls the display 35 to present one of the multiple pressure values in the unit that the user wants to check.

Additionally, with reference to FIGS. 2 to 4, the control module 30 has at least one adjusting button 37 electrically connected to the circuit board 31 and being operable for controlling the control unit on the circuit board 31 to set a target pressure. After the control unit acquires the pressure of the chamber 21 (or the to-be-inflated/to-be-deflated space) according to the pressure data, the control unit is configured to determine whether the pressure of the chamber 21 (or the inflated/deflated space) reaches the target pressure so as to decide whether the circuit board 31 continues to be electrically connected to the pump assembly 20 for transmission of the electric power.

With the control configurations described above, a user may operate said adjusting button 37 to set the target pressure for inflation or deflation and then operate the starting switch 33 for driving the pump assembly 20. Added with the pressure sensor 34 real-time sensing the pressure, the electric air pump is configured to inflate or deflate an object to the target pressure.

In the preferred embodiment, the control module 30 has two said adjusting buttons 37; each one of the two adjusting buttons 37 and the converting switch 36 adopts a button, is located in a respective one of the several openings on the shell body 11, and is pressable to be sensed by the control unit on the circuit board 31. The two adjusting buttons 37 are respectively configured for increasing and decreasing the target pressure. In other embodiments, each one of said adjusting buttons 37 and the converting switch 36 may adopt a knob or another type of switch, which is not limited to the preferred embodiment.

With reference to FIGS. 2 and 3, the pressure sensor 34 is directly mounted on the circuit board 31, and the top cover 24 of the pump assembly 20 has an annular post formed on a side of the top cover 24. The top cover 24 abuts against the circuit board 31 with the annular post, and the sensing space 40 is enclosed by the annular post of the top cover 24 and the circuit board 31. Compared to the pressure sensor 34 directly disposed in the chamber 21, the preferred embodiment needs no cable to connect between the pressure sensor 34 and the circuit board 31, which makes the assembly of the electric air pump easier. Also, the pressure sensor 34 can be directly detached from the circuit board 31 after separating the circuit board 31 and the pump assembly 20, which is convenient for repairing and maintenance.

Figure 6:
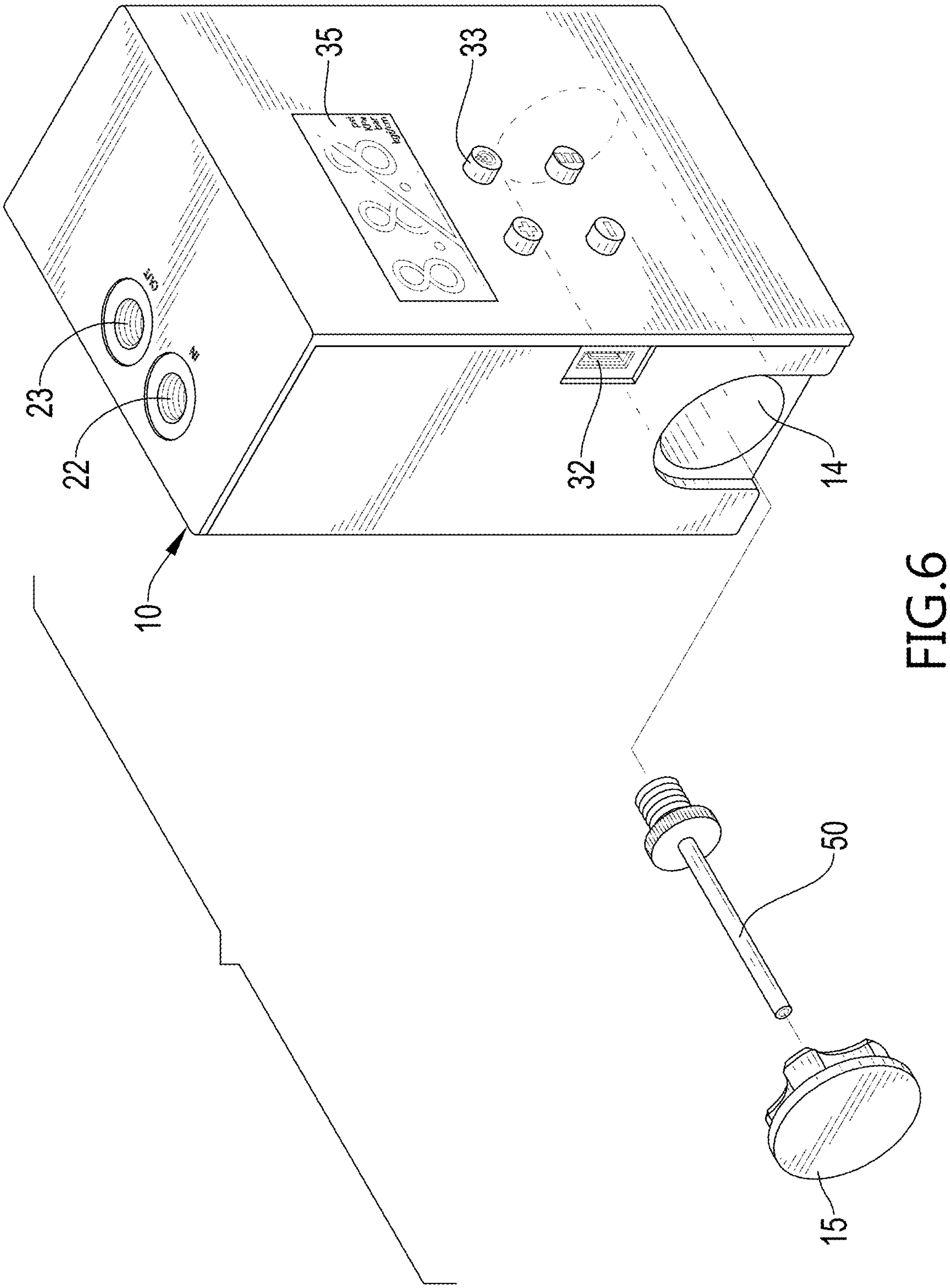
FIG. 6 is an operational view of the electric air pump in FIG. 1 storing an inflating needle.

With reference to FIG. 6, in the preferred embodiment, the outer shell 10 further has a containing space 14 and a cover 15. The containing space 14 is formed on a bottom of the outer shell 10 and communicates with the exterior of the outer shell 10 via an opening. The electric air pump further has an inflating needle 50. With reference to FIG. 5, the inflating needle 50 is configured to be connected to the inlet passage 22 or the outlet passage 23 for deflation or inflation of different balls.

With reference to FIG. 6, the inflating needle 50 can be contained in the containing space 14, and the cover 15 is detachably mounted to and covers the opening of the containing space 14. Thereby, the inflating needle 50 can be limited in the containing space 14 for storage and prevented from dropping, which is convenient for carrying the electric air pump with the inflating needle 50.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electric air pump powered by an external power source, the electric air pump comprising:
- an outer shell;
- a pump assembly disposed inside the outer shell and having
  - a chamber;
  - an inlet passage communicating with the chamber and an exterior of the chamber; and
  - an outlet passage communicating with the chamber and the exterior of the chamber; and
- a control module disposed in the outer shell and having
  - a circuit board;
  - a power supply port electrically connected to the circuit board and being connectable to an external power source; and
  - a starting switch electrically connected to the circuit board and being operable for controlling whether the circuit board is electrically connected to the pump assembly;
- wherein
- the pump assembly is drivable by electric power to pump air to sequentially flow through the inlet passage, the chamber, and the outlet passage;
- the outer shell has
  - a containing space communicating with an exterior of the outer shell via an opening; and
  - a cover detachably mounted to and covering the opening;
- the electric air pump has an inflating needle configured to be connected to one of the inlet passage and the outlet passage and configured to be contained in the containing space and limited in the containing space by the cover;
- the control module further has a pressure sensor that is electrically connected to the circuit board, is disposed in a sensing space communicating with the chamber, and is configured to sense a pressure of the sensing space so as to send a pressure data;
- the pressure sensor is disposed on the circuit board;
- the pump assembly further has a top cover covering an opening of the chamber and abutting the circuit board;
- the sensing space is enclosed by the top cover and the circuit board; and
- the inlet passage and the outlet passage are formed on the top cover.

2. The electric air pump as claimed in claim 1, wherein the control module has a display electrically connected to the circuit board and being observable from the exterior of the outer shell; and the control module is configured to control the display to present pressure information of the chamber according to the pressure data.

3. The electric air pump as claimed in claim 2, wherein the control module has a converting switch electrically connected to the circuit board and being operable to send a converting signal; and the control module is configured to calculate multiple pressure values in different units according to the pressure data and configured to control the display to present one of the multiple pressure values according to the converting signal.

4. The electric air pump as claimed in claim 1, wherein the control module has at least one adjusting button electrically connected to the circuit board and being operable for the control module to set a target pressure; and the control module is configured to acquire a pressure of the chamber according to the pressure data and to determine whether the pressure of the chamber reaches the target pressure so as to decide whether the circuit board continues to be electrically connected to the pump assembly.

5. The electric air pump as claimed in claim 2, wherein the control module has at least one adjusting button electrically connected to the circuit board and being operable for the control module to set a target pressure; and the control module is configured to acquire a pressure of the chamber according to the pressure data and to determine whether the pressure of the chamber reaches the target pressure so as to decide whether the circuit board continues to be electrically connected to the pump assembly.

6. The electric air pump as claimed in claim 3, wherein the control module has at least one adjusting button electrically connected to the circuit board and being operable for the control module to set a target pressure; and the control module is configured to acquire a pressure of the chamber according to the pressure data and to determine whether the pressure of the chamber reaches the target pressure so as to decide whether the circuit board continues to be electrically connected to the pump assembly.

* * * * *